(12) United States Patent
Le et al.

(10) Patent No.: US 9,471,414 B2
(45) Date of Patent: Oct. 18, 2016

(54) SERVICE RESPONSE DETECTION AND MANAGEMENT ON A MOBILE APPLICATION

(71) Applicant: Apollo Education Group, Inc., Phoenix, AZ (US)

(72) Inventors: David Le, San Jose, CA (US); Manish Upendran, San Jose, CA (US); Ted Wong, San Francisco, CA (US); Jo-Jo Lin, Cupertino, CA (US); Bryce Griner, Mesa, AZ (US); Isabel George, Foster City, CA (US)

(73) Assignee: Apollo Education Group, Inc., Phoenix, AZ (US)

(*) Notice: Subject to any disclaimer, the term of this patent is extended or adjusted under 35 U.S.C. 154(b) by 164 days.

(21) Appl. No.: 14/457,664

(22) Filed: Aug. 12, 2014

(65) Prior Publication Data

US 2016/0048418 A1 Feb. 18, 2016

(51) Int. Cl.
*G06F 11/00* (2006.01)
*G06F 11/07* (2006.01)
*H04W 4/00* (2009.01)
*H04L 29/08* (2006.01)

(52) U.S. Cl.
CPC ......... *G06F 11/079* (2013.01); *G06F 11/0709* (2013.01); *G06F 11/0742* (2013.01); *G06F 11/0793* (2013.01); *H04W 4/001* (2013.01); *H04L 67/10* (2013.01)

(58) Field of Classification Search
USPC ....................................................... 714/4.11
See application file for complete search history.

(56) References Cited

U.S. PATENT DOCUMENTS

| 6,789,182 | B1* | 9/2004 | Brothers | G06F 11/3476 712/227 |
| 2004/0111652 | A1* | 6/2004 | Shoaib | H04L 41/0654 714/15 |
| 2008/0244314 | A1* | 10/2008 | Okamura | H04L 12/2825 714/31 |
| 2011/0314331 | A1* | 12/2011 | Beach | G06F 11/079 714/26 |
| 2013/0311836 | A1* | 11/2013 | Hurst | G06F 11/0742 714/48 |
| 2014/0237304 | A1* | 8/2014 | Lai | G06F 11/0742 714/57 |

* cited by examiner

*Primary Examiner* — Sarai Butler
(74) *Attorney, Agent, or Firm* — Hickman Palermo Becker Bingham LLP (57) ABSTRACT

Techniques for detecting and addressing performance issues related to a mobile application are provided. Examples of performance issues include a backend service (to which the mobile application is configured to transmit requests) becoming unavailable or overloaded, a third-party service that the mobile application relies on for data pertaining to the backend service becoming unavailable, and security vulnerabilities or code irregularities in the code of the mobile application. A fallback service that is separate from the backend service detects the performance issues and sends fallback data to the mobile application. The fallback data may cause the mobile application to operate in an offline mode, where the mobile application requests locally stored data instead of transmitting data requests to the backend service. The fallback data may reference page views that the mobile application downloads and displays instead of other page views that are based on data from the backend service.

32 Claims, 3 Drawing Sheets

SERVICE RESPONSE DETECTION AND MANAGEMENT ON A MOBILE APPLICATION

FIELD OF THE DISCLOSURE

The present disclosure relates to detecting performance issues related to a mobile application and dynamically addressing those performance issues.

BACKGROUND

A mobile application is a computer program designed to run on smartphones, tablet computers, or other mobile devices. Mobile applications are usually available through application distribution platforms, which are typically operated by the owner of the mobile operating system, such as the Apple App Store, Google Play, Windows Phone Store, and BlackBerry App World. Typically, mobile applications are downloaded from an application distribution platform to a target device, such as an iPhone, BlackBerry, Android phone or Windows Phone.

Originally, mobile applications were offered for general productivity and information retrieval, including email, calendar, contacts, and stock market and weather information. However, public demand and the availability of developer tools drove rapid expansion into other categories, such as mobile games, factory automation, GPS and location-based services, banking, order-tracking, ticket purchases, and mobile medical applications.

Each mobile application is designed to communicate with a dedicated server or set of servers. Typically, if a mobile application's server shuts down or becomes otherwise unavailable, then the mobile application will not be responsive to user input. The mobile application provides no explicit indication to the user that the server is down or that anything is wrong.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

An intelligent fallback service provides services to mobile applications when the mobile applications experience usage or performance issues related to one or more backend or target services with which the mobile applications are configured to communicate. The intelligent fallback service resides in a network that is separate from the network in which the backend services reside. The intelligent fallback service receives log information from the backend services and/or mobile applications to determine their respective state. The intelligent fallback service analyzes the log information to determine what information to send to the mobile applications to enable the mobile applications to address the usage or performance issues. For example, if the backend services become inaccessible, then the intelligent fallback service send data to the mobile applications to allow the mobile applications to access certain data while the backend services are offline.

The following description includes numerous examples where a mobile application is an education curriculum application that allows a user to register for one or more online classes, retrieve learning materials in the form of text, audio, and/or video, retrieve class assignments, post or upload completed class assignments, take examinations, and submit examination answers. However, embodiments are not limited to the education context. Embodiments are applicable to any type of mobile application that experiences usage or performance issues relative to a backend service that supports the mobile application.

System Overview

Figure 1:
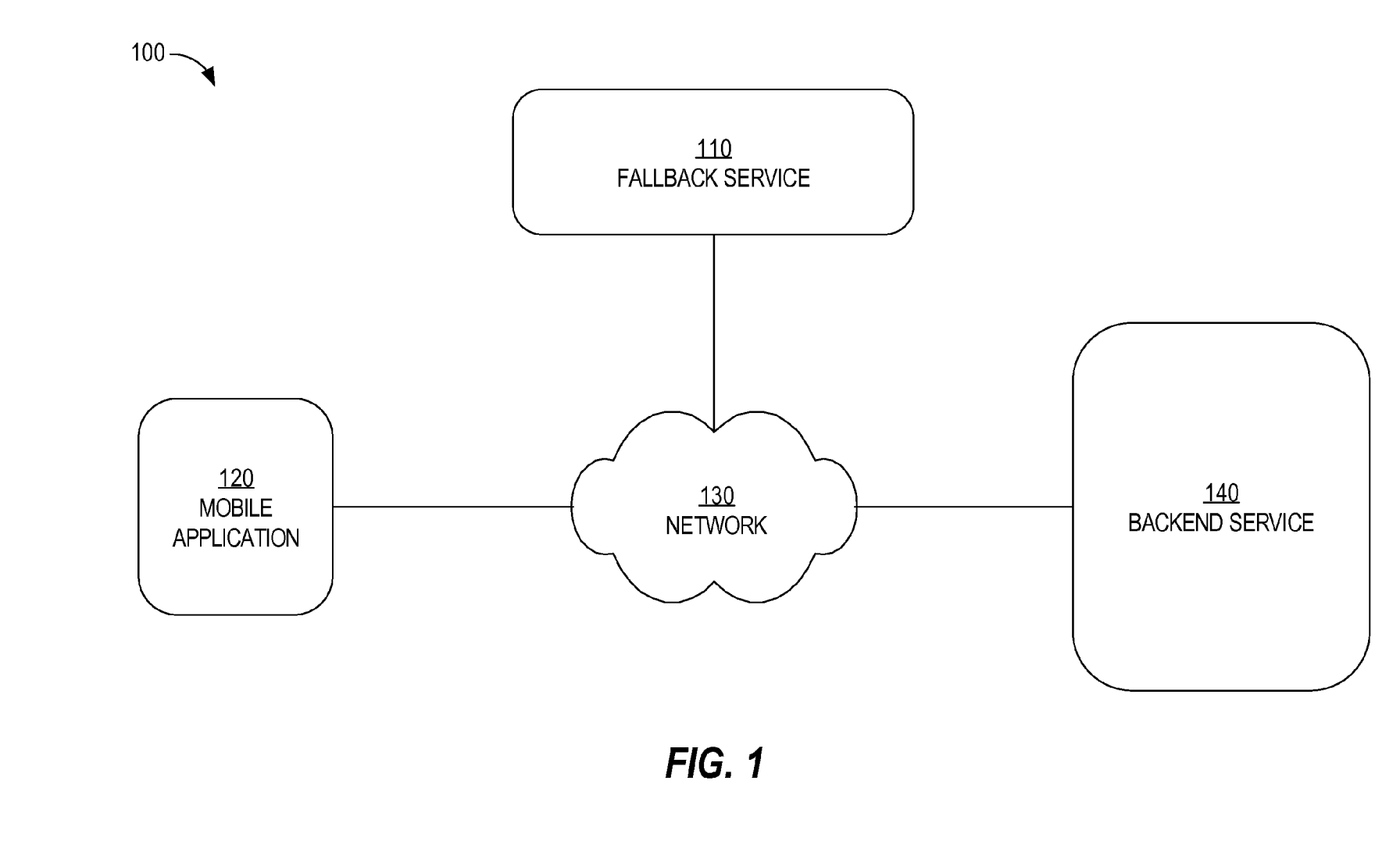
FIG. 1 is a block diagram that depicts an example system architecture, in an embodiment.

FIG. 1 is a block diagram that depicts an example system architecture 100, in an embodiment. System architecture 100 includes a fallback service 110, a mobile application 120, a network 130, and a backend service 140.

Fallback service 110, mobile application 120, and backend service 140 are communicatively coupled via network 130. Network 130 may be implemented by any medium or mechanism that provides for the exchange of data between fallback service 110, mobile application 120, and backend service 140. Examples of network 130 include, without limitation, a network such as a Wide Area Network (WAN) or the Internet, or one or more terrestrial, satellite or wireless links.

Mobile application 120 executes on a mobile device, such as a tablet computer, a laptop computer, or a smartphone. Mobile application 120 is configured to request and retrieve data from backend service 140. Mobile application 120 may also be configured to upload data to backend service 140. Such communications may involve REST (or Representational State Transfer) APIs or SOAP. Also, such communications may or may not be the result of user input relative to a user interface displayed by mobile application 120. For example, the user interface may include a button to display current education classes for which a user is registered. User selection of the button initiates a request that mobile application 120 sends to backend service 140 over network 130.

As another example, mobile application 120 periodically syncs (i.e., not in response to user input) information stored by backend service 140 with information stored locally on the mobile device upon which mobile application 120 executes. For example, every hour, mobile application 120 sends a request to backend service 140 for any additional information (, such as new course assignments) related to a particular college course (e.g., Linear Algebra) for which a user has registered. If new assignments have been made and are not currently accessible to mobile application 120, then backend service 140 sends information about the new assignments to mobile application 120.

While only one mobile application is depicted in FIG. 1, system architecture 100 may include many mobile applications, each of which is configured to communicate with backend service 140.

Backend service 140 may store information about what each mobile application (with which backend service 140 communicates) has downloaded from backend service 140. In this way, backend service 140 may determine whether there is new information available for a particular mobile application instance to download.

Each of fallback service 110 and backend service 140 may be implemented in hardware, software, or any combination of hardware and software. Fallback service 110 may be implemented on a single computing device or multiple computing devices. Similarly, backend service 140 may be implemented on a single computing device or multiple computing devices.

In an embodiment, backend service 140 comprises multiple components, such as a database, content management applications, a SOAP (Simple Object Access Protocol) component, a JDBC (Java Database Connectivity) component, and a RSS (Rich Site Summary) feed component that publishes RSS feeds.

While system architecture 100 includes a single backend service 140, backend service 140 may represent multiple distinct services that support and provide data to mobile application 120. For example, one backend service may allow a user to register for available classes (e.g., a biology class and a physics class), another backend service may allow for a user to retrieve, through mobile application 120, information about class assignments for classes with which the user is already registered, another backend service may allow an instructors to use mobile application 120 to post (or otherwise make available to the relevant students) grades or test scores and/or new class assignments, and another backend service may allow a student to view an online lecture through mobile application 120.

Fallback Service

In an embodiment, mobile application 120 is configured to generate report data for fallback service 110. The report data may be sent directly to fallback service 110 or may be sent to another location to which fallback service 110 has access.

Report data from mobile application 120 may indicate one of numerous problems or issues that mobile application 120 is experiencing. Example problems or issues may be an unscheduled outage of backend service 140, an outage of a third-party service on which mobile application 120 relies for data related to backend service 140, a security vulnerability of mobile application 120, a code irregularity, and a "broken" or "buggy" feature that mobile application 120 implements.

In an embodiment, backend service 140 is configured to generate report data for fallback service 110. The backend service-generated report data may be sent directly to fallback service 110 or may be sent to another location to which fallback service 110 has access. The report data from backend service 140 may indicate that a third-party service is currently unavailable or that backend service 140 will be shut down in the near future. Thus, fallback service 110 monitors multiple (or all) events that occur at backend service 140.

Based on report data, fallback service 110 determines to provide fallback data to mobile application 120. This determination may be based on report data from mobile application 120 and/or report data from backend service 140. The nature of the fallback data provided to mobile application 120 may differ based on the type of issue or problem that mobile application 120 is experiencing. The following description illustrates four main issues: backend outage, scheduled maintenance, third-party service outage, and mobile application execution issues. However, embodiments are not limited to fallback service 110 assisting mobile application 120 with these four issues. A mobile application 120 may encounter other types of issues for which fallback service 110 may provide fallback data.

Backend Outage

In an embodiment, fallback service 110 detects that backend service 140 is experiencing an outage or is otherwise unavailable. The outage may be unscheduled or not predicted. Fallback service 110 may detect such a scenario in one of multiple ways. For example, fallback service 110 may receive, from mobile application 120, an error message (e.g., as part of report data from mobile application 120).

For example, mobile application 120 may detect an error when attempting to connect to backend service 140. Specifically, the receipt of a "service unreachable error" message by mobile application 120 may indicate that backend service 140 is experiencing an outage or is otherwise unavailable. This message may be generated and transmitted by backend service 140. As another example, mobile application 120 may experience an error in response to submission of user input. The mobile application 120 may generate an error and send the report data about the error to backend service 140.

Another way in which fallback service 110 may detect that backend service 140 is unavailable is by periodically (or at other intervals) sending alive messages to backend service 140. If fallback service 110 does not receive a reply from backend service 140 in response to one of the alive messages, then fallback service 110 may determine that backend service 140 is experience an outage and, thus, must be unable to respond to requests from mobile application 120.

Another way in which fallback service 110 may detect that backend service 140 is unavailable is based on the absence of report data from backend service 140. Such absence may indicate that backend service 140 is currently offline or otherwise unavailable. For example, backend service 140 may send an alive message (e.g., as part of the service's report data) every minute to a log that is accessible to fallback service 110. If fallback service 110 determines, from the log, that the most recent alive message is older than one (or two) minutes, then fallback service 110 may determine that backend service 140 is experiencing an outage.

Fallback Data

In response to detecting that backend service 140 is experiencing an outage, fallback service 110 sends fallback data to mobile application 120. The fallback data allows mobile application 120 to operate and display data to a user even though backend service 140 is unavailable. For example, the fallback data may include an instruction for mobile application to operate in an offline mode (instead of online mode). In offline mode, if any interface object or page view relies on backend service 140, then the interface object is disabled (or not displayed) or the page view is never created. Alternatively, in offline mode, any interface object that normally initiates a request to backend service 140 is reconfigured to reference data that is stored locally on the mobile device. For example, a graphical button, when selected in online mode, causes a list of class assignments for a particular registered class to be displayed. In offline mode, when the graphical button is selected, mobile application 120 displays a version of the list that is stored locally on the mobile device and that was previously displayed. Although the list may be stale, displaying a stale list may be deemed better than displaying no list at all. Mobile application 120 may be configured to display a message that indicates that any locally stored data that is displayed while in offline mode may not be accurate or up-to-date.

Thus, fallback service 110 may "push" fallback data to mobile application 120 without ever having received, from mobile application 120, data that would have initiated the fallback data, such as report data generated by mobile application 120. Push notification technologies that may be used to push fallback data to mobile applications include Apple's IOS and Android's Google Cloud Messaging.

Fallback service 110 may send fallback data to multiple mobile applications, even if fallback service 110 detected the service outage through one mobile application. Thus, in response to detecting that backend service 140 is experiencing an (unscheduled) outage, not only does backend service 140 interact with mobile application 120, fallback service 110 may also interact with other instances of the mobile application executing on other mobile devices.

For example, the outage of a first backend service affects a first set of users but not a second set of users. The first backend service may provide data to mobile applications of the first set of users who are registered with a class in a set of classes that the first backend service supports. Fallback service 110 determines all the users that are affected by the outage of the first backend service and sends, to the corresponding mobile applications, fallback data to allow the mobile applications to operate in offline mode with respect to data provided by the first backend service.

In an embodiment, fallback data for one mobile application may be different than fallback data for another mobile application, even though the fallback data is to address the same performance issue (such as a security vulnerability or scheduled maintenance of backend service 140). For example, a mobile application on one software platform (e.g., IOS) is different than a mobile application on another software platform (e.g., Android) while both mobile applications provide the same (or similar) user interface and interact with backend service 140. Each mobile application may require different fallback data for the same performance issue. As another example, a mobile application on one type of mobile device (e.g., smartphone) is different than a mobile application on another type of mobile device (e.g., laptop) even though both mobile devices run the same or similar operating system (e.g., Android).

Thus, fallback service 110 stores type data that identifies, for each mobile application, the type of device and/or the type of software platform upon which the mobile application executes. Then, when determining which fallback data to transmit to a particular mobile application, fallback service 110 uses the type data to identify the type of device and/or the type of software platform associated with the particular mobile application. The type data is then used to select the appropriate fallback data for the particular mobile application.

Page Views

A page view is a view that mobile application 120 displays based on data retrieved locally or remotely (relative to mobile application 120). If a particular page view is based on data provided by a backend service that is not available, then mobile application 120 will not display the particular page view. Even if a page view is based on data from many backend services, if just one of the backend services is unavailable, then mobile application 120 will not generate the page view. Instead, mobile application 120 may display an error or simply not be responsive. For example, if a graphical button on a first page view normally causes mobile application 120 to display a second page view that depends on data from an unavailable backend service, then selecting the graphical button may not result in any change and the first page view would still be displayed.

In an embodiment, fallback data includes a reference to a page view of a page view flow that comprises multiple page views that may have an order. For example, one page view may be linked to two page views and each of the two page views may be linked to one or more page views. The page view (or page view flow) may be stored in storage that is remote to mobile application 120, but that is accessible (e.g., local) to fallback service 110.

Mobile application 120 receives the fallback data, identifies the reference, and retrieves the page view (or page view flow) from remote storage. The page view (or page view flow) may replace another page view (or page view flow) that would have been generated based on data retrieved from backend service 140 if that service was available. In this way, mobile application 120 may operate (in offline mode, at least with respect to backend service 140) and allow the user to interact with mobile application 120 and data stored locally on the mobile device.

A page view retrieved using fallback data may be considered an "offline version" of another page view that mobile application 120 would generate if backend service was online/available. One difference between an online version and an offline version of a page view is that data from backend service 140 is not required in order to generate the offline version. For example, instead of displaying a list of documents that are stored by backend service 140, the offline version of a page view displays a list of documents that are stored by mobile application 120 (which may be the same). As another example, instead of including a button or link that, when selected, causes a data request to be transmitted to backend service 140, an offline version either does not include the button or link or replaces the button or link with a button or link that causes a data request to be responded to by the local storage system of the mobile device.

Backend Service Coming Back Online

Eventually, backend service 140 comes back online and is available for communicating with mobile application 120. Fallback service 110 may detect that backend service 140 is available again through one of multiple ways. Examples include receiving an explicit alive message from backend service 140 (which may be configured to notify fallback service 110 whenever backend service 140 boots up or starts up again), receiving a reply from backend service 140 in response to fallback service 110 sending an alive message to backend service 140, or detecting that mobile application 120 (or another instance of mobile application 120 on another mobile device) is successfully communicating with backend service 140.

In an embodiment, mobile application 120 is configured to repeatedly send, to fallback service 110, a check message requesting whether backend service 140 is back online. For example, mobile application 120 may send the check message every five minutes. The timing of when to send the messages may be dictated by fallback service 110. For example, fallback service 110 may send a response to such a check message with an expiry header that indicates a clock time (e.g., 5:34 PM), a time duration from the current time (e.g., ten minutes), or some other time data that indicates when mobile application 120 should next send a check message.

In response to fallback service 110 detecting that backend service 140 is online again, fallback service 110 notifies mobile application 120 (and, optionally, other instances of mobile application 120). Upon receiving a notification, mobile application 120 switches from an offline mode to an online mode. Additionally or alternatively, mobile application 120 ignores (or deletes) any page views or page view flows retrieved from (or through) fallback service 110. Instead, mobile application 120 transmits requests to backend service 140 and generates and displays page views that are based on data retrieved through the requests.

While in offline mode, a user of mobile application 120 may have intended to cause data to be submitted to backend service 140. For example, a user may have desired to post a comment to a digital bulletin board associated with a particular class in which the user enrolled, upload completed class assignments, and upload grades (if the user is a class instructor) so that students of the corresponding class may view their respective grades. However, in an embodiment, instead of attempting to transmit data to backend service 140 while in offline mode, mobile application 120 stores that data locally. In response to detecting that backend service 140 is back online, mobile application 120 determines whether there is any locally-stored data that is "waiting" to be transmitted. If so, mobile application 120 transmits that data. Such a data transmission may involve mobile application 120 sending multiple, individual upload requests to backend service 140 (and, optionally, other related backend services, not depicted).

Example Scenario

Figure 2:
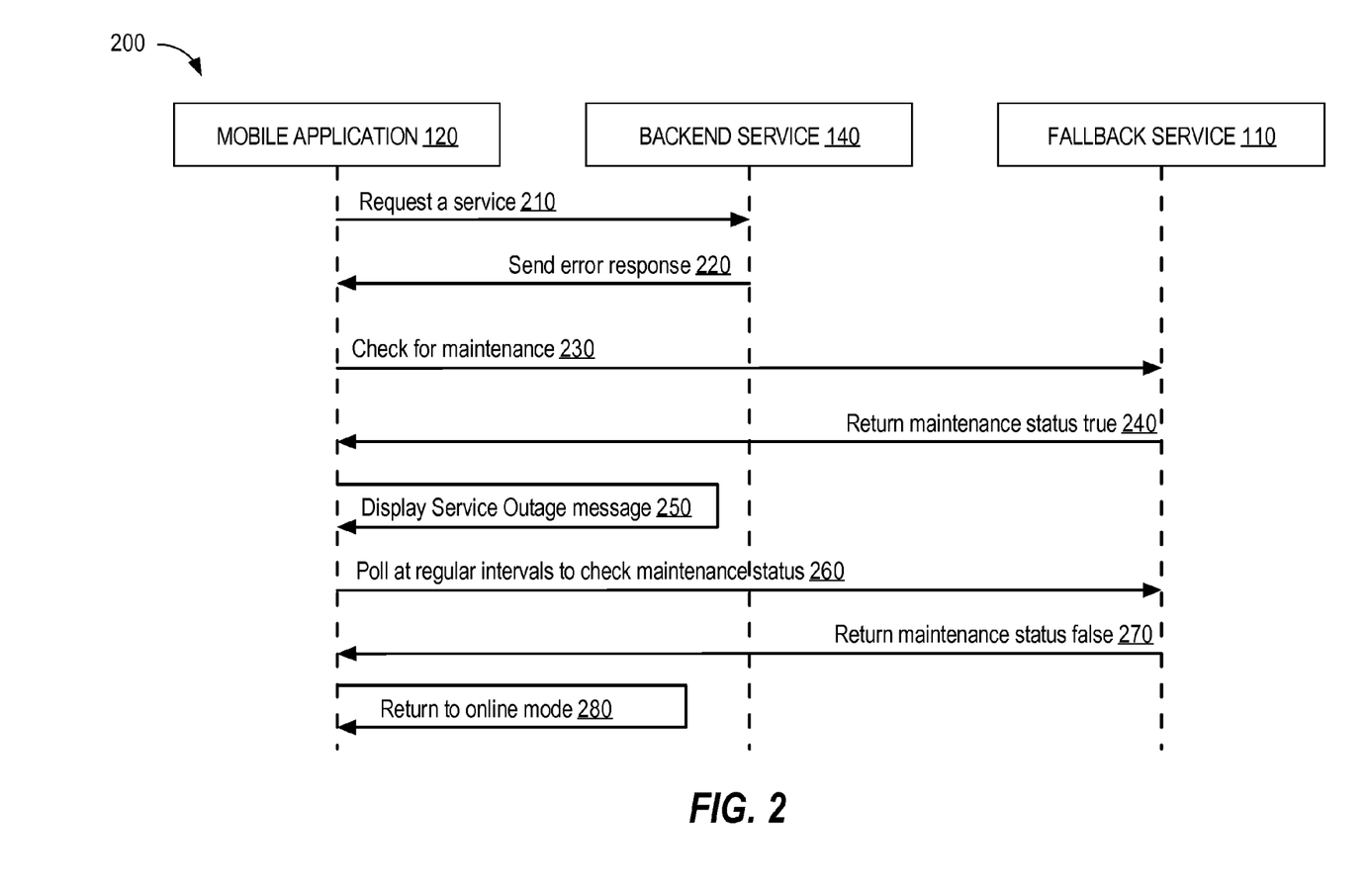
FIG. 2 is a sequence diagram that depicts an example process 200 for responding to a an outage scenario, in an embodiment.

FIG. 2 is a sequence diagram that depicts an example process 200 for responding to a an outage scenario, in an embodiment.

At step 210, mobile application 120 requests a service from backend service 140. The request may request data from backend service 140. Alternatively, the request may be to upload data to backend service 140. The data may be associated only with the user that initiated the request. Alternatively, the data may be "public" in that any user of backend service 140 has access to the data.

At step 220, backend service 140 sends an error message to mobile application 120. The error message indicates that the backend service 140 is unavailable or is otherwise unable to respond to the request, at least in a timely manner.

At step 230, in response to receiving the error message, mobile application 120 sends, to fallback service 110, a maintenance check message to determine the current status of backend service 140. Thus, in this example scenario, fallback service 110 is notified of the outage of backend service 140 through mobile application 120. As noted previously, other embodiments involve fallback service 110 detecting the outage without the involvement of mobile application 120.

At step 240, in response to receiving the maintenance check message, fallback service 110 sends a reply to mobile application 120. The reply indicates whether backend service 140 is currently experiencing an outage for which maintenance is required. In this example, the reply indicates that backend service 140 is currently experiencing maintenance issues as a result of an outage, which may or may not be scheduled.

Processing the reply may cause mobile application 120 to enter an offline mode such that mobile application 120 does not send requests to backend service 140 even though mobile application 120 would normally have done so in response to user input. The offline mode may dictate that instead of sending requests to backend service 140, requests are sent to local storage to retrieve a version of the requested data (if available), which may or may not be stale relative to the requested data that is stored by backend service 140.

Alternatively, mobile application 120 enters the offline mode in response to receiving the error message in step 220.

At step 250, in response to receiving the reply, mobile application 120 causes a service outage message to be displayed on a screen of a mobile device. This allows the user if the mobile device to be aware of the service outage and take appropriate actions, such as delaying attempts to use backend service 140.

At step 260, mobile application 120 sends, to fallback service 110, another maintenance check message. Step 260 may be repeated multiple times until mobile application 120 receives a reply that indicates that backend service 140 is available or online. Step 260 may be performed regularly, such as every five minutes. The period between maintenance check messages may be pre-configured in mobile application 120, but later modified by fallback service 110 sending a reply that informs mobile application 120 to change the period.

At step 270, fallback service 110 eventually sends, to mobile application 120, a reply that indicates that backend service 140 is currently available and not undergoing maintenance.

At step 280, mobile application 120 returns to online mode. In online mode, mobile application 120 operates under the assumption that backend service 140 is functioning properly. Thus, instead of requesting data that is stored locally and that may be stale, mobile application 120 sends requests for the data to backend service 140, which should have an up-to-date or current version of the requested data. Also, any data that mobile application 120 stored locally (while in offline mode) instead of uploading to backend service 140, mobile application 120 sends that locally-stored data to backend service 140.

Scheduled Maintenance

In an embodiment, fallback service 110 detects that backend service 140 will be offline or unavailable sometime in the future. Backend service 140 may be taken down for a scheduled (i.e., planned) maintenance. Fallback service 110 may detect the scheduled outage by receiving report data directly from backend service 140 or by analyzing a log that indicates the scheduled outage. The scheduled outage data may indicate a specific (or approximate) start time and/or may indicate a specific (or approximate) end time.

In an embodiment, fallback service 110 is configured to automatically transmit fallback data to mobile application 120 (and other affected mobile applications) in response to detecting that the current time is equal to (or approaching) the start time of the scheduled outage. For example, if fallback service 110 detects a scheduled outage at time T1 and determines that the start time of the scheduled outage is at time T4, then fallback service 110 sends fallback data to mobile application 120 at time T3 or T4. As described previous, the fallback data may cause mobile application 120 to operate in online mode and/or download a page view (or page view flow) that replaces a page view (or page view flow) that would have been generated if backend service 140 was available.

Similarly, fallback service 110 may be configured to automatically transmit a notification to mobile application 120 (and other affected mobile applications) in response to detecting that the current time is equal to (or after) the end time (if known) of the scheduled outage. For example, if fallback service 110 determines that the end time of the scheduled outage is at time T9, then fallback service 110 sends a notification to mobile application 120 at time T9 or T10. Mobile application 120 is configured to determine, based on the notification, that backend service 140 is online and is available to process requests transmitted by mobile application 120. Mobile application 120 reverts to online mode, at least with respect to data and services provided by backend service 140.

Overload Conditions

Backend service 140 may support many mobile applications, each of which may be sending requests to backend service 140 at or near the same time. In such an overload condition, backend service 140 may have to drop connections or simply not respond to client requests.

In an embodiment, fallback service 110 detects that backend service 140 is experiencing an overload condition. Such detection may occur by analyzing report data that backend service 140 generates and to which fallback service 110 has access. As another example, mobile application 120 may be configured to generate and send, to fallback service 110, report data that indicates that backend service 140 is slow to respond to requests from mobile application 120. Such report data may indicate a time difference between sending of a request and receiving a response or may indicate that mobile application 120 is still waiting for responses.

In response to detecting that backend service 140 is experiencing an overload condition, fallback service 110 transmits, to mobile application 120 (and, optionally, other affected mobile applications) re-route data that indicates another destination to which mobile application 120 should transmit requests. The re-route data may specify a different IP address to which mobile application 120 should direct requests for services/data provided by backend service 140. Thus, backend service 140 may be "mirrored" across different, but parallel, computing systems.

Alternatively, instead of re-route data, fallback service 110 may transmit, to mobile application 120, throttle data that instructs mobile application 120 to send another request at some future time (and/or date) (e.g., in five minutes or one day) and allow the user of mobile application 120 to use local cache data up until that future time/date. Throttle data may be appropriate in place of re-route data if all instances of backend service 140 are overloaded.

In an embodiment, fallback service 110 may implement both approaches in response to detecting that backend service 140 is experiencing an overload condition. For example, fallback service 110 may send re-route data to 55% of mobile applications and send throttle data to 45% of mobile applications.

Additionally, fallback service 110 may send re-route data and/or throttle data in anticipation of requests from mobile application 120, i.e., before mobile application 120 generates report data that indicates that backend service 140 is not responding or is slow in responding. Fallback service 110 may make this determination in response to detecting that backend service 140 is experiencing an overload condition, whether the determination is made based on report data from backend service 140 or from one or more other mobile applications.

Third-Party Service Outage

In some cases, mobile application 120 might rely on one or more third-party services when displaying data associated with backend service 140. For example, a third-party service may be a storage service that stores electronic textbooks on behalf of users of backend service 140. Mobile application 120 may be configured to access the third-party service to retrieve (at least a portion) of the electronic textbooks. However, like backend service 140, the third-party service may experience problems, such as a service outage, service maintenance, or a security vulnerability, etc.

In an embodiment, fallback service 110 detects that a third-party service is experiencing a problem (e.g., being unavailable to respond to requests from mobile application 120). This detection may be performed in one of multiple ways. For example, mobile application 120 may be configured to send, to fallback service 110, report data indicating the outage of a third-party service in response to receiving an error message when attempting to access the third-party service. As another example, fallback service 110 may periodically send an alive message to one or more third-party services and, if fallback service 110 does not receive a reply to an alive message after a certain period of time, then fallback service 110 determines that the corresponding third-party service is not available. As another example, the third-party service may send report data to fallback service 110 indicating that the third-party service was subject to a computer virus.

In response to detecting that a third-party service is experiencing a problem, fallback service 110 determines another third-party service that is capable of providing data that mobile application 120 is requesting. For example, fallback service 110 determines that mobile application 120 is requesting an electronic textbook from a first third-party service that is currently unavailable and that a second third-party service also stores a copy of the electronic textbook. In response, fallback service 110 sends, to mobile application 120, service identification data (e.g., a URL) that identifies the second third-party service. In this way, fallback service 110 allows mobile application 120 to re-route its request to another third-party service without requiring the user of mobile application 120 to perform any actions or be aware of the first third-party service being unavailable.

As another example, fallback service 110 sends, to mobile application 120, throttle data that instructs mobile application 120 to retry the third-party service at a later time. Additionally or alternatively, fallback service 110 sends a warn message to be displayed that warns the user of mobile application 120 that the third-party service is experiencing an outage or an overload condition, or represents a security risk if accessed at this time.

Mobile Application Execution Issues

The foregoing description has focused on problems that originate at backend service 140 or third-party services, such as scheduled and unscheduled outages and overload conditions. However, mobile application 120 (and other mobile applications that are configured to communicate with backend service 140) may suffer from problems that originate from the mobile application itself. Such problems are referred to herein as "execution issues." An execution issue is an issue that arises based on the executable code of mobile application 120.

Example types of execution issues include security vulnerabilities, a code logic irregularities, and dysfunctional features that mobile application 120 implements. An example of a dysfunctional feature is a GUI feature that, when selected by a user, does not cause (a) any data to be transmitted or (b) any change in the user interface that is displayed, when its intended purpose is one of (a) or (b).

Another example of a dysfunctional feature is a GUI auto layout feature that supports different screen sizes. An auto layout feature handles complex adaptive layout design using sub-views' positions and designer-specified constraints in a main view to auto size relative layout and position the sub-views in the main view. Accommodating the different screen sizes can lead to constraint conflicts that result in sub-view overlaying or incorrect alignments. In such cases, fallback service 110 can detect and transmit conflict resolutions fallback to correct the issue.

Detection may be performed manually. Alternatively, detection may be performed (at least partially) automatically. For example, fallback service 110 may determine that users of instances of the mobile application are rarely accessing a particular page view that represents the end of a page view flow or a branch of a page view flow. For example, a simple page view flow may be pages A→B→C→D, but users of a certain device type are rarely (if ever) reaching page view D (or data associated with D). This may be an indication that a link to page view D is being overlaid by other data so that users are unable to even view the link.

An example of a security vulnerability is cross-site scripting (XSS), which is a type of computer security vulnerability typically found in Web applications. XSS enables attackers to inject client-side script into web pages viewed by other users. A cross-site scripting vulnerability may be used by attackers to bypass access controls, such as a same origin policy. Another example of a security vulnerability is cross-site request forgery (CSRF), which is a type of malicious exploit of a website where unauthorized commands are transmitted from a user that the website trusts. Unlike XSS, which exploits the trust a user has for a particular site, CSRF exploits the trust that a site has in a user's browser.

An example of a code logic irregularity is code execution flow that leads to a negative or unintended result that impacts the user experience or user session state. For example, a code irregularity may lead mobile application 120 to crash. As a result, mobile application 120 may be configured to generate and send report data about the state of mobile application 120 at the time of the crash. The report data may indicate the last (e.g., five) actions that the user initiated and/or the last page view(s) that were displayed prior to the crash. As another example, a code irregularity may lead to corrupt data being rendered to the user due to corrupt user session state. As another example, a user cannot move to a nest or subsequence or detail view due to a missing or corrupted precondition requirement. For example, in a A→B→C→D page flow, the user cannot move to page view D due to a corrupted session.

In an embodiment, fallback service 110 detects that mobile application 120 is experiencing an execution issue. How fallback service 110 detects the execution issue may depend on the type of execution issue. Detection may initially be performed manually. For example, mobile application 120 (and, optionally, other instances of mobile application 120) generate report data that users/administrators of fallback service 110 analyze. The report data may be explicit about the execution issue or implied from the context of the execution flow and execution results. In either case, the users/administrators may determine what fallback data is appropriate to send to mobile application 120 in light of the execution issue.

In response to detecting an execution issue, fallback service 110 sends, to mobile application 120, fallback data that acts as a "patch" without requiring the mobile device to download an updated version of mobile application 120, which updated version may not be available for a significant amount of time in the future.

The fallback data may include executable code or a reference to executable code that is stored remotely relative to the mobile device upon which mobile application 120 executes. The executable code may be stored and maintained by fallback service 110. When downloaded to a mobile device, the executable code acts as a plug-in for mobile application 120 such that the executable code is executed instead of the executable code upon which mobile application 120 is originally based.

For example, if mobile application 120 allows a virtually unlimited number of characters to be entered into a zip code field, then the executable code that is downloaded as a result of mobile application 120 processing fallback data from fallback service 110 is used to perform one or more validations, such as checking whether the text in the zip code field (and, optionally other text fields whose inputs are transmitted to backend service 140) is five characters in length. If not, then the downloaded executable code may cause an error message to be displayed to the user instead of sending the inputted data to backend service 140. The error message may prompt the user to enter in five characters only into the zip code field. In addition to or alternative to a character length check, the validation code may include an empty string check and/or a pattern check.

Instead of executable code, fallback data may be interpretable instructions that mobile application 120 parses and interprets to generate executable code. Thus, mobile application 120 generates the code (based on data from fallback service 110) that will be used to address the execution issue.

Even though fallback service 110 detects that mobile application 120 (and, optionally, a few other mobile applications) may be experiencing an execution issue, fallback service 110 may provide fallback data to other mobile applications that are also configured to communicate with backend service 140. For example, as noted previously, fallback service 110 may store identification data that identifies where all instances of a mobile application are executing, the types of devices upon which the instances are executing, and/or the types of software platforms upon which the instances are executing. Then, if fallback service 110 detects that one mobile application is experiencing an execution issue, then fallback service 110 uses the identification data to identify similarly-situated (e.g., same device type and software platform) instances of the mobile application and send fallback data to those instances.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
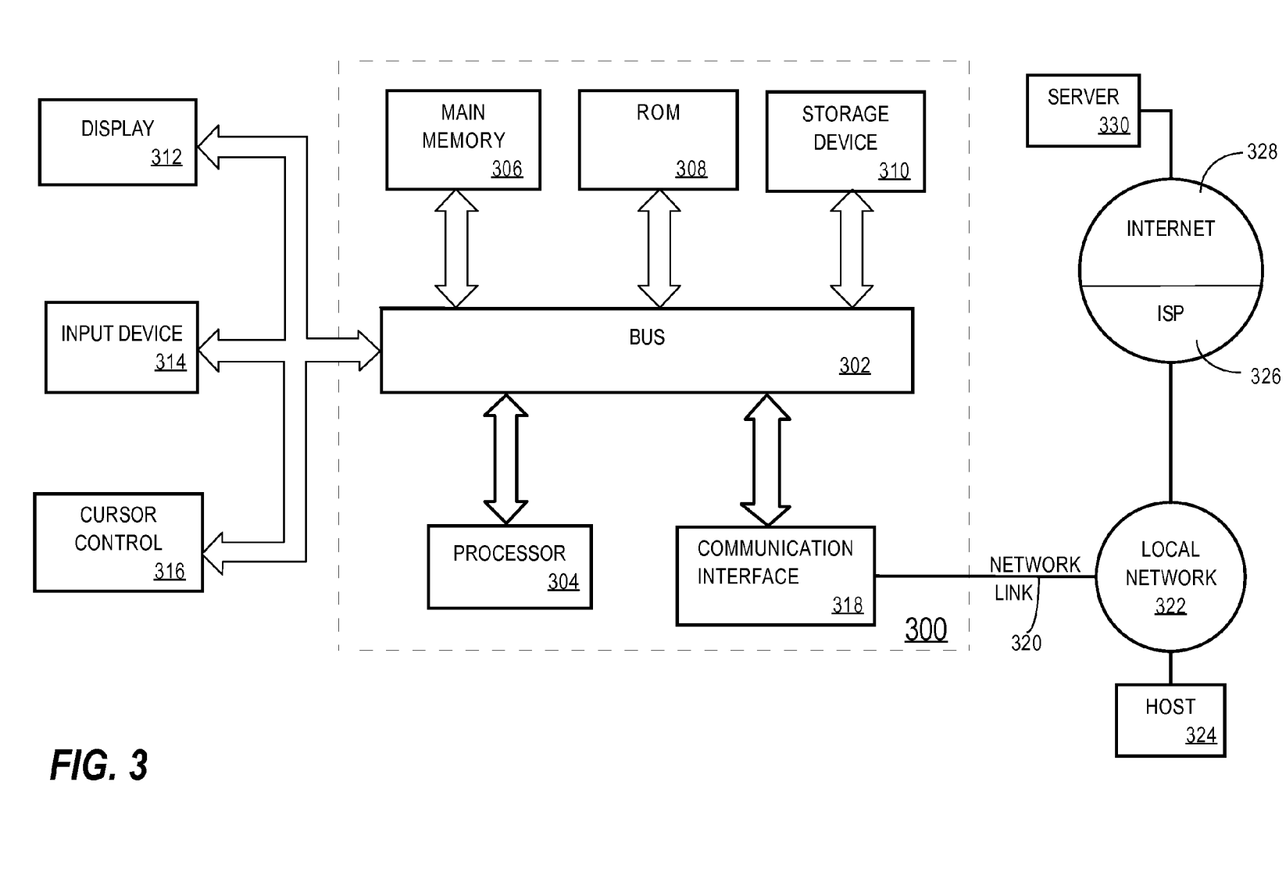
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, by a fallback service that resides in a first network that is different than a second network in which a set of one or more target services reside, information about a plurality of events that have occurred outside of the first network;
   analyzing the plurality of events;
   based on a particular event of the plurality of events, determining, by the fallback service, a set of one or more mobile applications to notify;
   wherein each mobile application in the set of one or more mobile applications is configured to communicate with the set of one or more target services;
   in response to determining the set of one or more mobile applications, sending a message from the fallback service to the set of one or more mobile applications;
   wherein the method is performed by one or more computing devices.

2. The method of claim 1, further comprising:
   determining, based on the particular event, that the set of one or more target services are experiencing an outage;
   wherein the message to the set of one or more mobile applications informs the set of one or more mobile applications of the outage and triggers each mobile application in the set of one or more mobile applications to operate in an offline mode.

3. The method of claim 2, wherein the message refers to a set of templates for the set of one or more mobile applications to access while the set of one or more target services are experiencing the outage.

4. The method of claim 2, further comprising:
   receiving, at the fallback service, information from the set of one or more mobile applications;
   wherein the information includes error data that indicates that the set of one or more mobile applications are receiving an error message from the set of one or more target services;
   wherein determining the set of one or more mobile applications comprises determining the set of one or more mobile applications based, at least in part, on a portion of the error data.

5. The method of claim 2, further comprising:
   after sending the message, detecting, by the fallback service, that the set of one or more target services are currently available;
   in response to detecting that the set of one or more target services are currently available, sending, to the set of one or more mobile applications, a notification that indicates that the set of one or more target services are currently available.

6. The method of claim 1, further comprising:
   determining, based on the particular event, that the set of one or more target services will experience a scheduled outage where the set of one or more target services will be unavailable to respond to a plurality of mobile applications during a particular time period;
   wherein the message to the set of one or more mobile applications informs the set of one or more mobile applications of the scheduled outage and triggers each mobile application in the set of one or more mobile applications to operate in an offline mode during the particular time period.

7. The method of claim 1, wherein:
   prior to receiving the message, the set of one or more mobile applications are using first destination data to access data provided by the set of one or more target services;
   the method further comprising determining, based on the particular event, that set of one or more target services are overloaded;
   the message to the set of one or more mobile applications includes second destination data that is different than the first destination data and that indicates another destination that the set of one or more mobile applications may use to access the data provided by the set of one or more target services.

8. The method of claim 1, further comprising:
   receiving, at the fallback service, information from the set of one or more mobile applications;
   wherein the information includes error data that indicates that the set of one or more mobile applications are experiencing one or more execution issues;
   wherein the message to the set of one or more mobile applications refers to additional code logic for the set of one or more mobile applications to execute to avoid the one or more execution issues.

9. The method of claim 8, wherein the one or more execution issues include a security vulnerability, a code logic irregularity, or a dysfunctional feature implemented in each mobile application of the set of one or more mobile applications.

10. The method of claim 1, further comprising:
    determining, based on the particular event, that a first third-party service is experiencing an outage;
    in response to determining that the first third-party service is experiencing an outage, identifying a second third-party service that is currently available;
    the message to the set of one or more mobile applications informs the set of one or more mobile applications of the second third-party service.

11. A method comprising:
receiving, by a mobile application that executes on a mobile device and that is configured to communicate with a set of one or more target services that reside in a first network, from a fallback service that resides in a second network that is different than the first network, fallback data that indicates how the mobile application is to handle a usage issue that is detected by the fallback service and that is related to the set of one or more target services;
processing, by the mobile application, the fallback data;
wherein the method is performed by the mobile device.

12. The method of claim 11, wherein:
the usage issue is the set of one or more target services becoming unavailable;
processing the fallback data comprises the mobile application switching from an online mode to an offline mode;
in response to switching to the offline mode, the mobile application accessing data that is stored locally, wherein the data was provided by the set of one or more target services prior to the set of one or more target services becoming unavailable.

13. The method of claim 12, wherein:
the usage issue is the set of one or more target services becoming unavailable during a particular period of time;
the fallback data indicates a start time;
switching from the online mode to the offline mode comprises switching to the offline mode in response to detecting that a current time equals the start time.

14. The method of claim 11, wherein: the usage issue is a first third-party service being unavailable; the first third-party service is separate from the set of one or more target services and stores particular data; the fallback data indicates a second third-party service that is different than the first third-party service and that is currently available;
processing the fallback data comprises: reading, by the mobile application, the fallback data to identify the second third-party service; sending, to the second third-party service, a request for the particular data.

15. The method of claim 11, wherein:
the usage issue is an execution issue that the mobile application is experiencing;
the fallback data refers to additional code logic for the mobile application to execute to avoid the execution issue;
processing the fallback data comprises executing the additional code logic.

16. The method of claim 15, wherein the execution issue is one of a security vulnerability, a code logic irregularity, or a dysfunctional feature implemented in the mobile application.

17. One or more non-transitory storage media storing instructions which, when executed by one or more processors, cause:
storing, by a fallback service that resides in a first network that is different than a second network in which a set of one or more target services reside, information about a plurality of events that have occurred outside of the first network;
analyzing the plurality of events;
based on a particular event of the plurality of events, determining, by the fallback service, a set of one or more mobile applications to notify;
wherein each mobile application in the set of one or more mobile applications is configured to communicate with the set of one or more target services;
in response to determining the set of one or more mobile applications, sending a message from the fallback service to the set of one or more mobile applications.

18. The storage media of claim 17, wherein the instructions, when executed by the one or more processors, further cause:
determining, based on the particular event, that the set of one or more target services are experiencing an outage;
wherein the message to the set of one or more mobile applications informs the set of one or more mobile applications of the outage and triggers each mobile application in the set of one or more mobile applications to operate in an offline mode.

19. The storage media of claim 18, wherein the message refers to a set of templates for the set of one or more mobile applications to access while the set of one or more target services are experiencing the outage.

20. The storage media of claim 18, wherein the instructions, when executed by the one or more processors, further cause:
receiving, at the fallback service, information from the set of one or more mobile applications;
wherein the information includes error data that indicates that the set of one or more mobile applications are receiving an error message from the set of one or more target services;
wherein determining the set of one or more mobile applications comprises determining the set of one or more mobile applications based, at least in part, on a portion of the error data.

21. The storage media of claim 18, wherein the instructions, when executed by the one or more processors, further cause:
after sending the message, detecting, by the fallback service, that the set of one or more target services are currently available;
in response to detecting that the set of one or more target services are currently available, sending, to the set of one or more mobile applications, a notification that indicates that the set of one or more target services are currently available.

22. The storage media of claim 17, wherein the instructions, when executed by the one or more processors, further cause:
determining, based on the particular event, that the set of one or more target services will experience a scheduled outage where the set of one or more target services will be unavailable to respond to a plurality of mobile applications during a particular time period;
wherein the message to the set of one or more mobile applications informs the set of one or more mobile applications of the scheduled outage and triggers each mobile application in the set of one or more mobile applications to operate in an offline mode during the particular time period.

23. The storage media of claim 17, wherein:
prior to receiving the message, the set of one or more mobile applications are using first destination data to access data provided by the set of one or more target services;
the instructions, when executed by the one or more processors, further cause determining, based on the particular event, that set of one or more target services are overloaded;

the message to the set of one or more mobile applications includes second destination data that is different than the first destination data and that indicates another destination that the set of one or more mobile applications may use to access the data provided by the set of one or more target services.

24. The storage media of claim 17, wherein the instructions, when executed by the one or more processors, further cause:
   receiving, at the fallback service, information from the set of one or more mobile applications;
   wherein the information includes error data that indicates that the set of one or more mobile applications are experiencing one or more execution issues;
   wherein the message to the set of one or more mobile applications refers to additional code logic for the set of one or more mobile applications to execute to avoid the one or more execution issues.

25. The storage media of claim 24, wherein the one or more execution issues include a security vulnerability, a code logic irregularity, or a dysfunctional feature implemented in each mobile application of the set of one or more mobile applications.

26. The storage media of claim 17, wherein the instructions, when executed by the one or more processors, further cause:
   determining, based on the particular event, that a first third-party service is experiencing an outage;
   in response to determining that the first third-party service is experiencing an outage, identifying a second third-party service that is currently available;
   the message to the set of one or more mobile applications informs the set of one or more mobile applications of the second third-party service.

27. One or more storage media storing instructions which, when executed by one or more processors, cause:
   receiving, by a mobile application that executes on a mobile device and that is configured to communicate with a set of one or more target services that reside in a first network, from a fallback service that resides in a second network that is different than the first network, fallback data that indicates how the mobile application is to handle a usage issue that is detected by the fallback service and that is related to the set of one or more target services;
   processing, by the mobile application, the fallback data.

28. The one or more storage media of claim 27, wherein:
   the usage issue is the set of one or more target services becoming unavailable;
   processing the fallback data comprises the mobile application switching from an online mode to an offline mode;
   the instructions, when executed by the one or more processors, further cause, in response to switching to the offline mode, the mobile application accessing data that is stored locally, wherein the data was provided by the set of one or more target services prior to the set of one or more target services becoming unavailable.

29. The one or more storage media of claim 28, wherein:
   the usage issue is the set of one or more target services becoming unavailable during a particular period of time;
   the fallback data indicates a start time;
   switching from the online mode to the offline mode comprises switching to the offline mode in response to detecting that a current time equals the start time.

30. The one or more storage media of claim 27, wherein:
   the usage issue is a first third-party service being unavailable;
   the first third-party service is separate from the set of one or more target services and stores particular data;
   the fallback data indicates a second third-party service that is different than the first third-party service and that is currently available;
   processing the fallback data comprises:
      reading, by the mobile application, the fallback data to identify the second third-party service;
      sending, to the second third-party service, a request for the particular data.

31. The one or more storage media of claim 27, wherein:
   the usage issue is an execution issue that the mobile application is experiencing;
   the fallback data refers to additional code logic for the mobile application to execute to avoid the execution issue;
   processing the fallback data comprises executing the additional code logic.

32. The one or more storage media of claim 31, wherein the execution issue is one of a security vulnerability, a code logic irregularity, or a dysfunctional feature implemented in the mobile application.

* * * * *